United States Patent [19]

Weiler

[11] Patent Number: 4,899,959
[45] Date of Patent: Feb. 13, 1990

[54] GAS TURBINE POWER PLANT ARRANGEMENT

[75] Inventor: Wolfgang Weiler, Dachau, Fed. Rep. of Germany

[73] Assignee: MTU Motoren-und Turbinen-Union Muenchen GmbH, Munich, Fed. Rep. of Germany

[21] Appl. No.: 168,165

[22] Filed: Mar. 15, 1988

[30] Foreign Application Priority Data

Mar. 17, 1987 [DE] Fed. Rep. of Germany ....... 3708596

[51] Int. Cl.⁴ .............................................. B64D 35/00
[52] U.S. Cl. .................................. 244/54; 416/170 R; 244/53 B
[58] Field of Search ....................... 416/170 B, 170 R; 244/54, 60, 17.27, 17.11; 464/99, 173; 60/39.02, 39.03, 39.161, 39.163, 39.2; 74/DIG. 5

[56] References Cited

U.S. PATENT DOCUMENTS

| | | | |
|---|---|---|---|
| 3,120,744 | 2/1964 | Dunn | 464/173 X |
| 3,423,048 | 1/1969 | Clarke et al. | 244/7 R |
| 3,703,076 | 11/1972 | Hagemeister | 464/99 X |
| 3,744,743 | 7/1973 | Nay et al. | 244/17.11 |
| 4,003,200 | 1/1977 | Zerlauth | 60/39.02 |
| 4,096,711 | 6/1978 | Carlson et al. | 464/99 |
| 4,151,710 | 5/1979 | Griffin et al. | 184/6.11 X |
| 4,207,758 | 6/1980 | Stone | 464/55 |
| 4,214,457 | 7/1980 | Wade et al. | 464/99 |
| 4,217,767 | 8/1980 | Eckley | 464/173 |
| 4,424,665 | 1/1984 | Guest et al. | 60/39.02 |
| 4,531,358 | 7/1985 | Smith | 184/6.11 X |
| 4,560,364 | 12/1985 | Cohen | 464/99 |
| 4,569,199 | 2/1986 | Klees et al. | 60/39.02 |
| 4,623,337 | 12/1986 | Moore | 244/17.19 |

FOREIGN PATENT DOCUMENTS

| | | |
|---|---|---|
| 1024288 | 2/1958 | Fed. Rep. of Germany . |
| 1104350 | 4/1961 | Fed. Rep. of Germany . |
| 1929399 | 1/1970 | Fed. Rep. of Germany . |
| 1756710 | 8/1970 | Fed. Rep. of Germany . |
| 2038328 | 4/1971 | Fed. Rep. of Germany . |
| 7518598 | 6/1980 | Fed. Rep. of Germany . |
| 0447162 | 12/1912 | France ........................... 464/173 |
| 337081 | 4/1959 | France . |
| 616222 | 1/1949 | United Kingdom . |

OTHER PUBLICATIONS

Jane's All the Worlds Aircraft 1983–84, Jane's Publishing Co Ltd, England.
Thomas Rex Flexible Disc Couplings Catalog, Chain Belt Co.
Ameriflex, High Performance Multiple Convoluted Diaphragm Couplings, Zurn.
"Gyrating Weights, Airfoils Stabilize Helicopter Rotor", Design News, vol. 13, No. 14, 7, 7, 1958, pp. 36, 37.
"Die Modernen Flugtriebwerke" by Kurt Grasmann, pp. 59, 82, 83; (1982). This Reference has been adequately discussed in the Introductory Portion of the present specification, translation is not readily available.
Flight, Bd. 74, 1958, Nr. 2586, S.231, Aug. 15, 1958 (p. 417).

Primary Examiner—Joseph F. Peters, Jr.
Assistant Examiner—Anne Sartelle
Attorney, Agent, or Firm—W. G. Fasse; D. H. Kane, Jr.

[57] ABSTRACT

A gas turbine power plant, especially for helicopters, includes a main engine and a reduction gear transmission forming a self-sufficient auxiliary modular unit. A compensating arrangement includes an articulated outer cover and a shaft section inside said outer cover connected for transmitting power and for compensating any position disalignment between the main engine and the helicopter main gear drive. The reduction gear transmission is directly, rigidly force-coupled to the helicopter main gear drive, and the compensating arrangement including the articulated outer cover and shaft section is located between the main engine and the reduction gear transmission, whereby the axial length spacing between the main engine and the helicopter main gear drive is substantially reduced.

16 Claims, 5 Drawing Sheets

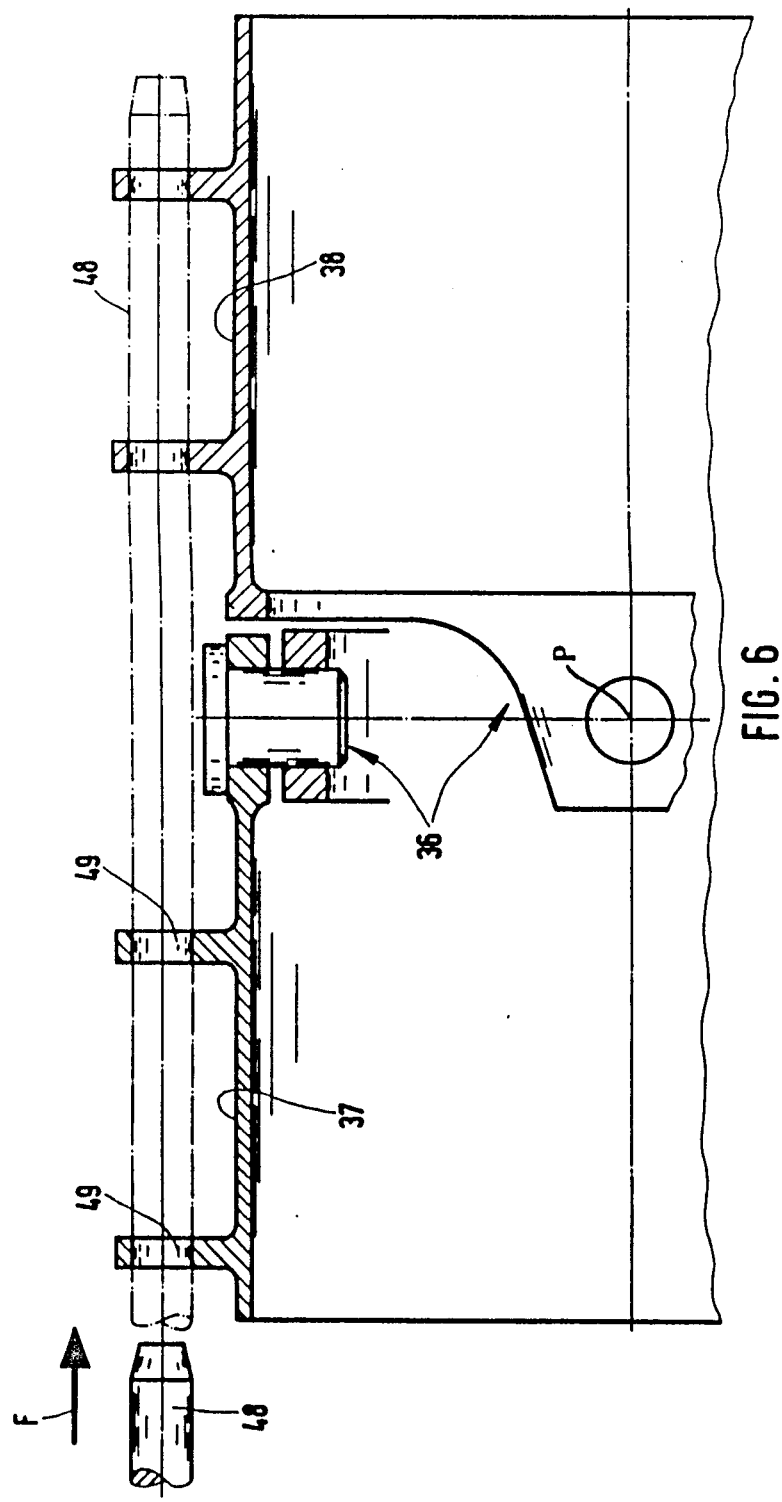

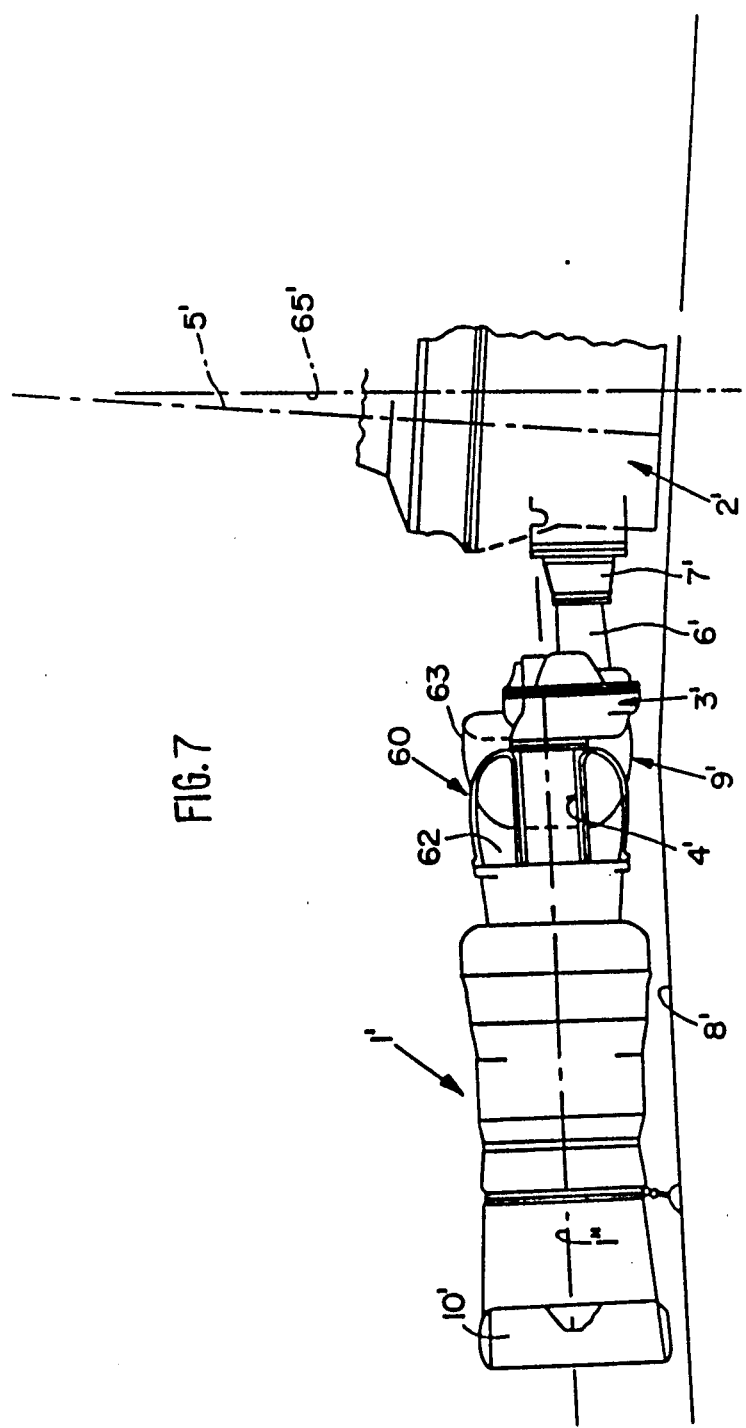

GAS TURBINE POWER PLANT ARRANGEMENT

FIELD OF THE INVENTION

The invention relates to a gas turbine power plant arrangement, especially for helicopters, having a main engine, a reduction gear transmission, preferably in the form of a self-sufficient auxiliary modular unit, and a compensating arrangement which compensates any position disalignments between the helicopter main transmission or main gear drive and the engine.

DESCRIPTION OF THE PRIOR ART

Known gas turbine power plants for helicopters of the type described above have the disadvantage of a relatively large installed volume. It is especially disadvantageous in the prior gas turbine power plants, that the total installed length of the power plant is relatively large. This long installed length is caused on the one hand primarily by the necessary articulated connection in the power train between the rotor main transmission or main gear drive and the gas turbine plant as will be described further below, and on the other hand, by the spacing between the main engine and the reduction gear transmission. As a result, the center of mass of the gas turbine power plant is shifted comparatively far to the rear, as seen in the flight direction, relative to the characteristic center of mass of the air frame such as a helicopter. This displacement of the center of mass of the power plant leads to an increased stern heavy character of the helicopter.

An improvement, or rather an avoidance, of the above described disadvantageous weight distribution could, perhaps, be achieved through a reduction of the weight of the gas turbine power plant itself. This could be accomplished by integrating the required reduction gear or power plant main gear drive into the main engine as a modular unit. Such a measure would be feasible or sensible if the gas turbine power plant is designed and developed simultaneously with a helicopter, whereby the main transmission of the power plant and the helicopter may be simultaneously optimized and constructed for efficient operation and utilization of space. Such a gas turbine power plant with a main transmission or main gear drive integrated at its end face is, for example, known from the handbook "Die Modernen Flugtriebwerke" (The Modern Aircraft Engines), by Kurt Grasmann, page 83, 1982, published by E. S. Mittler & Sohn, Herford, Federal Republic of Germany.

An essential disadvantage of such a known power plant, however, is seen in the exclusive applicability of the power plant to a certain aircraft type, for example, a specific helicopter. That is to say, the main power plant cannot practically or sensibly be installed in different helicopter types or fixed wing aircraft types in view of the differing requirements of rotational speeds and the like.

Especially due to this last mentioned reason, many power plant concepts are designed with the advantage that the reduction gear or power plant main transmission is arranged in the form of a self-sufficient auxiliary modular unit at a certain spacing away from the main power plant which is embodied as a turbo-engine.

Such an exposed arrangement of the reduction gear transmission simultaneously offers the advantage of a nearly unhindered inflow of air into the compressor. On the other hand, such an arrangement leads to a lengthening of the installed structural length due to the arrangement of an extension shaft in the power train between the power plant and the reduction gear transmission. This power drive concept is exemplified by a known power plant type shown, for example, on page 59 of the above cited handbook by Grasmann.

Another essential disadvantage of prior known gas turbine power plants for helicopters, in terms of the relatively long axial structural length of the power drive train, arises in that a jointed or articulated, elastically bendable compensating arrangement is required between the power plant and the main transmission or main gear drive of the helicopter. This compensating arrangement is provided to compensate any arising angular, height, and lateral disalignments between the power plant and the main gear drive of the helicopter. Due to the ultimate stiffness of the cellular structure, this compensating connection between the power plant and the main transmission cannot be achieved under a certain minimum length.

OBJECTS OF THE INVENTION

In view of the foregoing it is the aim of the invention to achieve the following objects singly or in combination:

to construct a gas turbiné power plant, especially for helicopters, in a compact manner to achieve a reduced installed volume and especially a reduced axial length of the entire power plant, particularly between the main engine and the main gear drive;

to allow the center of mass of such a power plant to be placed closer to the center of mass of the associated air frame to achieve improved handling characteristics;

to consolidate components of the drive train of such a power plant to achieve a size reduction and a corresponding weight reduction;

to construct and locate a misalignment compensating arrangement in such a way that vibration damping is achieved in addition to the intended length reduction;

to group components of such a power plant into self-sufficient modules or modular units which may easily be exchanged or even interchangeably installed in other aircraft types; and to provide an unobstructed air intake or exhaust outlet in such a power plant.

SUMMARY OF THE INVENTION

The above objects have been achieved in a gas turbine power plant for helicopters of the initially described type, according to the invention, wherein the reduction gear transmission is directly attached to the helicopter main transmission or main gear drive and the compensating arrangement is located between the main engine and the reduction gear transmission. In this manner, the invention achieves a considerable reduction of the length spacing between the main engine and the rotor main transmission, whereby the power plant center of mass may be moved considerably closer to the air frame center of mass than was achievable by prior known power plant arrangements.

The considerable reduction of the structural length of the entire power plant arrangement is achieved in that the space between the main engine and the reduction gear transmission, which previously was required for the so-called extension shaft, is now utilized for integrating the articulated compensating arrangement, which normally itself would take up a considerable axial length. Thus, the reduction gear transmission is rigidly connected with the rotor main gear drive or transmission for power transmission through a short axial path. Relative position disalignments are compensated between the main engine on one end and the rotor main gear drive including the reduction gear transmission of the power plant on the other end.

All the advantages of an exchangeable reduction gear transmission module or modular unit arranged at a spacing distance away from the main engine, some of which are mentioned above, are maintained according to the invention. These advantages include, among others for example, the applicability of the same main power plant type for various aircraft types, including helicopters and/or fixed wing aircraft with propeller drive. Furthermore, an advantageous air intake flow into the compressor is achieved for the main engine located behind the helicopter main gear drive and having a forward power take-off. Alternatively, an advantageous exhaust gas outlet flow is achieved for main engines having a rear power take-off arranged in front of the helicopter main transmission or main gear drive.

Further advantages are achieved by various embodiments of the invention, wherein various components of the entire power plant arrangement are grouped into separate modules or modular units. For example, according to the invention, the essential elements of the lubricating or oiling system are removed from the main gear drive or from the reduction gear transmission module and are instead incorporated into a specialized module or modular unit in order to better satisfy the prescribed criteria for the center of mass.

In another detail of the invention, the joints of the universal jointed or cardanically coupled portions of the compensating arrangement may be locked, for example for transport purposes, whereby, similar characteristics and advantages of known power plant types, are achieved in terms of transport and handling of the power plant during the installation or disassembly of the power plant. Further, when the locking is removed, the compensating arrangement also functions as a vibration damper in operation.

BRIEF DESCRIPTION OF THE DRAWINGS

In order that the invention may be clearly understood, it will now be described, by way of example, with reference to the accompanying drawings, wherein:

FIG. 6 is a partial lengthwise section through the universally jointed portion of the compensating arrangement with a locking device; and FIG. 7 shows an embodiment wherein the main engine is arranged in front of the main gear drive.

DETAILED DESCRIPTION OF PREFERRED EXAMPLE EMBODIMENTS AND OF THE BEST MODE OF THE INVENTION

Figure 1:
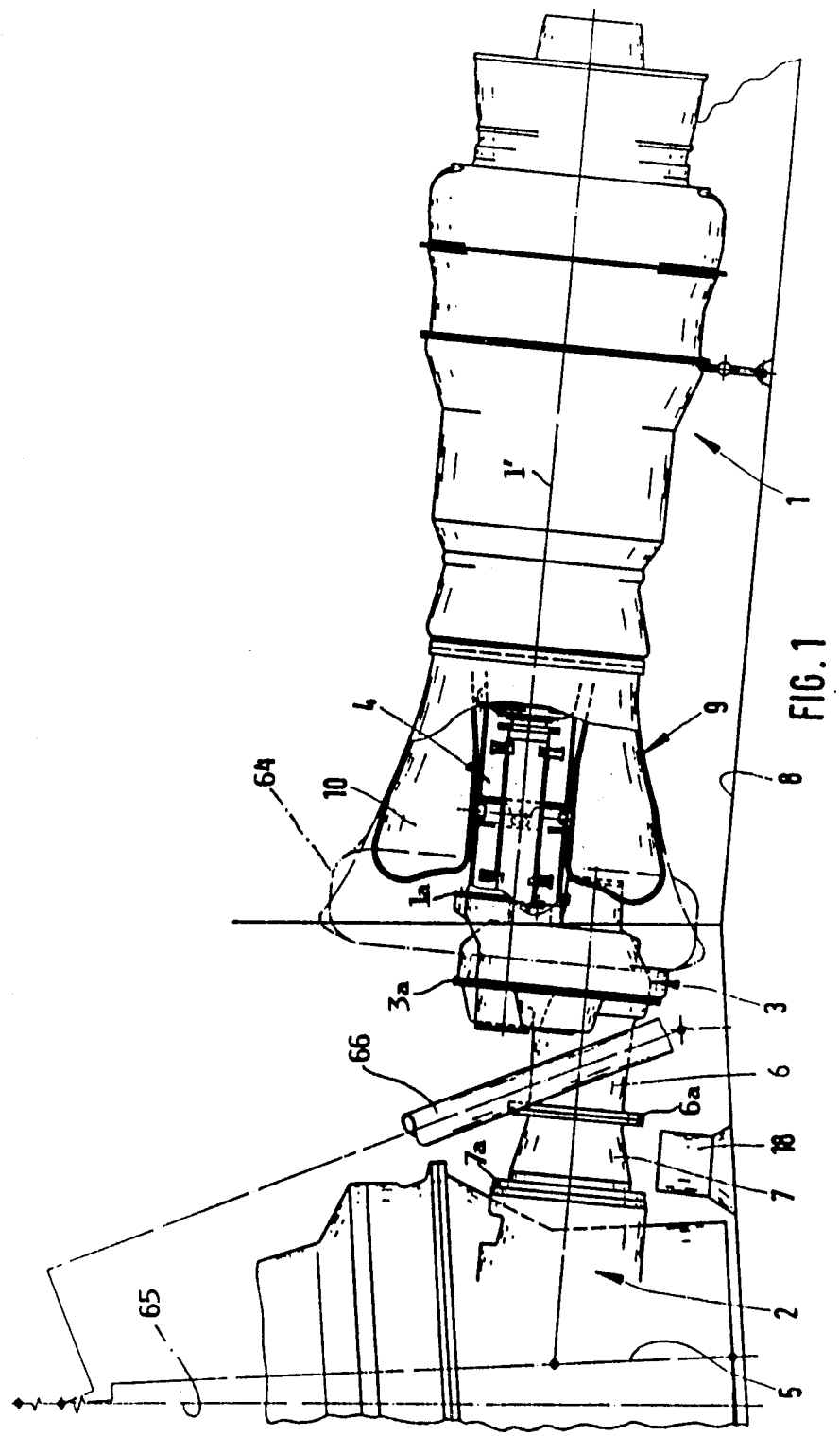
FIG. 1 is a partially cut-away schematic side view of the power plant according to the invention.

The gas turbine power plant for a helicopter as shown in FIG. 1, includes a reduction gear transmission 3 and an articulated compensating arrangement 4 for transmitting the shaft power of a main power unit or engine 1 to a helicopter main transmission or main gear drive 2. The compensating arrangement 4 compensates for any positional disalignments between the engine 1 and the helicopter main gear drive 2. The reduction gear transmission 3 is in the form of an autonomous or self-sufficient module or modular unit. In such a power plant, the concept of the invention provides that the reduction gear transmission 3 is directly attached in a force transmitting manner to the helicopter main transmission or main gear drive 2 and that the articulated compensating arrangement 4 is mounted between the main engine 1 and the reduction gear transmission 3.

The rotor main transmission 2 drives the helicopter rotor, to which the rotor blades, not shown, are mounted, about an axis 5 indicated in FIG. 1 by a dash-dotted line. The reduction gear transmission 3 of the power plant is rigidly attached to the rotor main gear drive 2 by appropriate housing shells 6 and 7 and by respective attachment flanges 6a, 7a, and 3a.

The gas turbine power plant is mounted on a platform type roof 8 of the helicopter in a manner such that the main engine 1 and the other power drive train components are tilted slightly downwardly toward the rear end of the power plant, whereby the axis of the power plant components forms an angle greater than 90° relative to the axis 5 of the helicopter rotor.

In the present example embodiment according to FIG. 1, that is, with the gas turbine power plant arranged behind the helicopter main gear drive 2 in the flight direction from right to left in FIG. 1, the shaft power of the main engine 1 is available at its front power take-off at the front end of the main engine 1. FIG. 1 further shows an auxiliary module or modular unit 9 in the area of the front end of the main engine 1. The module 9 includes the reduction gear transmission 3, the compensating arrangement 4, and the engine air intake 10.

As shown in FIG. 1 the articulated compensating arrangement 4 is located directly inside the air intake thereby reducing the overall axial length substantially by the length of the compensating arrangement.

In contrast to the example embodiment shown, it is also possible to arrange the gas turbine power plant in front of the helicopter main transmission as seen in the flight direction and as shown in FIG. 7. In this case, the shaft power of the main engine is available at a power take-off at the rear end of the main engine for transmission to the rotor shaft. In this modification the auxiliary module or modular unit of the main engine would include the reduction gear transmission, the compensating arrangement, and at least part of the exhaust gas system.

Figure 2:
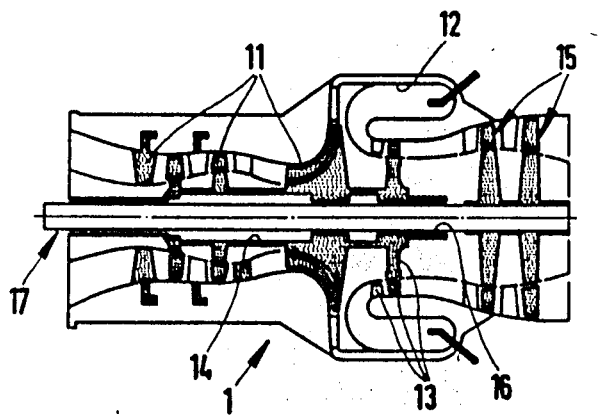
FIG. 2 is a schematic lengthwise section through the main power unit or engine of the power plant.

FIG. 2 shows a schematic axial section through the main engine 1. As seen in the direction of the main air throughflow, that is, from the left to the right in FIG. 1, the gas generator of the main engine 1 includes a combined axial-radial compressor 11, a reversing annular combustion chamber 12, and a compressor drive turbine 13 which drives the compressor 11 through a common hollow shaft 14 onto which the turbine 13 and compressor 11 are mounted at opposite ends. A free-running, two-stage output power turbine 15 is mounted downstream of the compressor drive turbine 13 to be impinged upon and driven by the exhaust stream of the turbine 13. The output power turbine 15 is mounted on a turbine inner shaft 16 which passes forward through the hollow shaft 14 of the gas generator to form a power take-off shaft end 17 in the area of the compressor air intake. Thus, the power output of the engine 1 is tapped at the power take-off end 17.

Figure 3:
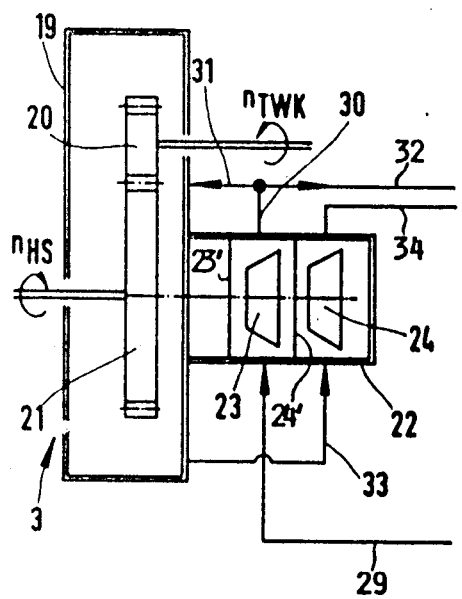
FIG. 3 is a schematic diagram of a module or modular unit for the reduction gear transmission and associated lubricating means including oil pumps.
Figure 4:
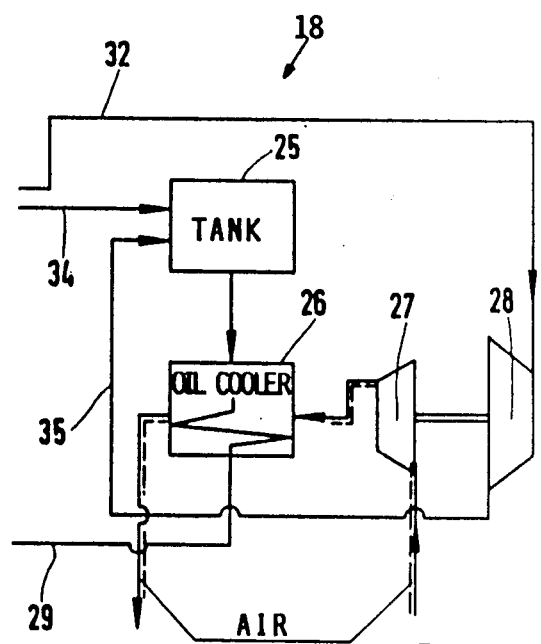
FIG. 4 is a block circuit diagram of an auxiliary module or modular unit for the essential elements of the transmission oil system.

FIG. 3 shows details of the reduction gear transmission 3 of the power plant which is embodied as a self-sufficient module or modular unit. The essential components of the lubricating or transmission oil system are removed from the module of the reduction gear transmission 3 and instead are incorporated in a specialized module or modular unit 18 as shown in FIG. 4. Furthermore, the entire oil system for providing oil to the reduction gear transmission 3 may also be incorporated in this specialized module 18. In the arrangement according to FIG. 1, this specialized module 18 is preferably arranged near the helicopter main gear drive 2 as shown in FIG. 1 by the box 18. Through this arrangement of the box 18, or rather the specialized module 18, near the main gear drive 2, that is in the area between the reduction gear transmission 3 and the main gear drive 2, an additional possibility of shifting the gas turbine power plant center of mass in a direction toward the rotor axis 5 is achieved.

As an example, as shown in FIG. 3, the module of the reduction gear transmission 3 includes a pair of meshing gear wheels 20 and 21 arranged in a transmission housing 19 for reducing the engine rotational speed $n_{TWK}$ which is applied to the gear wheel 20, to a reduced output speed $n_{HS}$ available at the output of the gear wheel 21. A pump housing 22 is arranged on the rear side of the transmission housing 19 to house oil pumps 23 and 24 driven by the gear wheel 21. The two oil pumps 23 and 24 are locally separated from one another by an appropriate partition or bulkhead 23', 24'.

The specialized module 18 according to FIG. 4, corresponding to the box 18 of FIG. 1, includes the essential elements of the oil system, for example an oil tank 25, an air/oil cooler 26, a cooling air blower 27, as well as a hydraulic drive motor 28 for the cooling air blower 27. For example, an electric motor could be provided instead of the hydraulic drive motor 28 in an alternative embodiment.

Although the two modules 3 and 18 according to FIG. 3 and FIG. 4 are spacially separated from one another in their arrangement in the power plant system, they are functionally interconnected as elements of the transmission oil supply.

After the oil returns from the air/oil cooler 26 through the hydraulic conduit 29, the oil pump 23 pumps the oil into the transmission housing 19 through conduits 30 and 31 and into the hydraulic drive motor 28 through conduits 30 and 32. Oil returns from the transmission housing 19 through the conduit 33 to the other pump 24 which pumps the oil back to the tank 25 through a conduit 34. The oil returning from the hydraulic drive motor 28 flows through the return conduit 35 back to the tank 25.

Figure 5:
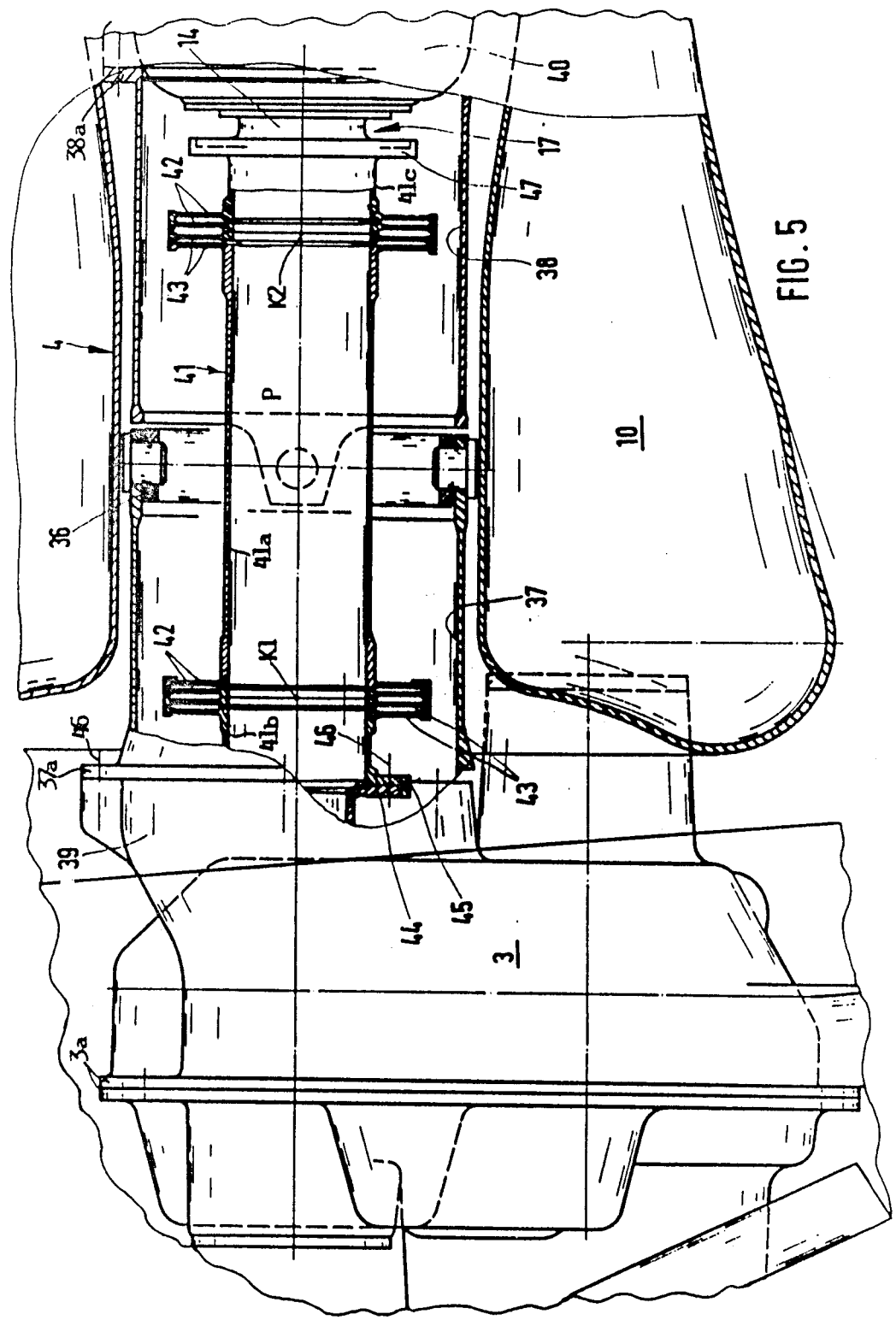
FIG. 5 is an enlarged partial sectional view of details of FIG. 1, showing the location and structure of the articulated compensating arrangement between the main engine and the reduction gear transmission.

As shown in FIG. 5, the articulated elastic compensating arrangement 4 includes an angularly movable universal joint coupling 36 between two neighboring ends of pipe sections 37 and 38 forming an outer casing or housing for a compensating hollow shaft section 41 having hollow shaft portions 41a, 41b, and 41c. The pipe section 37 is mounted by a flange 37a at its outer end to a housing extension 39 of the reduction gear transmission 3. The outer end of the other pipe section 38 is mounted by a flange 38a to a housing end portion 40 of the main engine 1 near the engine output end. Furthermore, the hollow shaft portions 41a, 41b, 41c of the compensating arrangement 4 form the inner articulated hollow drive shaft 41. These portions 41a, 41b, 41c are articulated to each other by membrane type members 42 and 43 and project radially from the shaft 41 and are arranged at a spacing from one another, e.g., near the ends of the middle shaft portion 41a. The membranes 42 and 43 may be, e.g., metal disks welded to respective adjacent shaft portions 41a, 41b, 41c, and to one another for respectively connecting the end portions 41b and 41c to the major middle portion 41a of the shaft 41. The membranes 42 and 43 form power transmitting, yet elastically flexible, articulated junctions in the shaft 41 and simultaneously damp oscillations and vibrations which may occur in the shaft 41, whereby a more quiet run of the entire power plant is achieved. In a still simpler embodiment the membranes may be constructed as corrugated hollow sleeves welded at each end to the respective shaft portion.

According to FIG. 1 and FIG. 5, the compensating arrangement 4 is mounted coaxially to or rather in axial alignment with the axis 1' of the main engine, in a force-locked or force transmitting manner. Such axial alignment is present when the engine 1 is not operating. However, when the engine is operating the shaft section 41 can flex relative to points K1 and K2 for compensating misalignments between unit 3 and engine 1. Due to the cardanic or universal joint 36, the outer casing 37, 38 can flex about the point P.

The connection between the inner articulated shaft 41 and the reduction gear transmission 3 may be achieved most simply by means of a shaft stub plug-in connection. For example, according to FIG. 5, the flange-like end 44 of the input shaft of the reduction transmission 3 is inserted into the socket-shaped collar end 45 of the articulated drive shaft 41, whereby a force transmitting connection may be achieved by means of bolts fastened, for example, at 46. The other end 47 of the articulated shaft 41 may be coupled to the output end 14 of the turbine shaft 16, shown in FIG. 2, of the main engine 1 by a similar plug-in or flange type connector 17.

As shown by an example embodiment in FIG. 6, in order to achieve similar characteristics in the power plant according to the invention as in prior known power plants, for transporting or handling the power plant and engine, during installation or dismounting of the power plant, a locking arrangement is provided for the universal joint 36 which couples the two pipe sections 37 and 38. This locking arrangement may, for example, include a rod 48 which is removably inserted through eyelets 49 in the lengthwise or axial direction of the pipe members 37 and 38 as shown by the direction arrow F. Thus, the reduction gear transmission 3 is semi-rigidly locked to the main engine 1 so as to prevent any fluttering or shimmying of the components, especially as a securing measure during transport.

Although the invention has been described with reference to specific example embodiments, it will be appreciated, that it is intended to cover all modifications and equivalents within the scope of the appended claims. For example, the invention is also intended to include the arrangement of two or more separate gas turbine engines in the power plant of a single aircraft, including rigid wing aircraft.

FIG. 7 is a partially cut-away schematic side view of the power plant according to a further embodiment of the invention, wherin the gas turbine power plant is arranged in front of the helicopter main transmission 2' as seen in the flight direction. In this case, the shaft power of the main engine 1' is available at a power take-off at the rear end of the main engine 1'. The shaft power of the main engine can be taken off from the rear end of the shaft which belongs to a power turbine (as 15 in FIG. 2). In this further embodiment the auxiliary module or modular unit 9' of the main engine 1' includes the reduction gear transmission 3', the compensating arrangement 4' and at least part of the engine exhaust gas system 60. The exhaust gas system 60 includes an exhaust chamber 62 spaced from and encircling the compensating arrangment 4' and further communicating with an exhaust pipe 63 which extends laterally from said exhaust chamber 62. Thus, as shown in FIG. 7, the compensating arrangement 4' is located directly inside the exhaust chamber 62 thereby reducing the overall axial length substantially by the length of compensating arrangement. The main engine 1' incorporates a circular air intake 10' within the longitudinal axis 1" of the engine and thus being contrary to the embodiment of FIG. 1, which shows an air intake 10 with an intake opening 64 in a position sideways from the engine axis 1'. FIG. 7 further includes—among others—the following features as in FIG. 1, that is: axis 5' of the helicopter rotor; platform type roof 8' of the helicopter and appropriate housing shells 6' and 7'.

Reference numbers 65 (FIG. 1) or 65' (FIG. 7) characterize a perpendicular plane pointing out the respective inclination of the corresponding helicopter rotor axis 5 (FIG. 1) and 5' (FIG. 7) thereto. Only FIG. 1 represents a section of one of at least a number of flexibly arranged supporting masts 66 for the helicopter rotor.

What I claim is:

1. A gas turbine power plant, especially for a helicopter, comprising a main engine (1, 1') including fresh air intake means (10) and exhaust gas discharge means (62), a power transmission train including reduction gear transmission means (3, 3') for reducing an engine r.p.m., main gear drive means (2, 2') for transmitting engine power, shaft means forming part of said power transmission train, and compensating means (4, 4') for compensating any position disalignments between said main engine (1, 1') and said main gear drive means (2, 2'), means attaching said reduction gear transmission means (3, 3') directly to said main gear drive means (2, 2'), and means mounting said compensating means (4, 4') directly between an output of said main engine (1, 1') and an input of said reduction gear transmission means (3, 3') substantially axially and radially within one of said fresh air intake means (10) and said exhaust gas discharge means (62) for effectively reducing an installed length of said power plant so that a distance between said main engine (1, 1') and said main gear driving means (2, 2') is reduced substantially by the axial length of said compensating means (4, 4').

2. The gas turbine power plant of claim 1, wherein said main engine is arranged behind said main gear drive means, as seen in a flight direction, wherein said main engine comprises a power output shaft forming said output at a front end of said engine, and wherein said main engine further comprises an auxiliary module including said reduction gear transmission means, said compensating means, and said fresh air intake means for supplying fresh air to said main engine.

3. The gas turbine power plant of claim 1, wherein said main engine is arranged in front of said main gear drive means, as seen in a flight direction, wherein said main engine comprises a power output shaft forming said output at a rear end of said engine, and wherein said main engine further comprises an auxiliary module including said reduction gear transmission means, said compensating means, and said exhaust gas discharge means for discharging engine exhaust gases.

4. The gas turbine power plant of claim 1, wherein said compensating means are arranged in axial alignment with an axis of said main engine.

5. The gas turbine power plant of claim 1, wherein said reduction gear transmission means comprise power input means and power output means, said power transmission train comprising coupling means for coupling said shaft means at least to said power input means of said reduction gear transmission means, said reduction gear transmission means further comprising first gear housing means, said main gear drive means comprising second gear housing means, and wherein said attachment means comprise flange coupling means for rigidly interconnecting said first and second gear housing means.

6. The gas turbine power plant of claim 5, wherein said coupling means comprises a shaft stub coupling (44, 45) between said power input means and said shaft means.

7. The gas turbine power plant of claim 1, further comprising a separate lubricating modular unit comprising substantially an oil or lubricating system for said reduction gear transmission means.

8. The gas turbine power plant of claim 7, wherein said lubricating modular unit is arranged near said main gear drive means.

9. The gas turbine power plant of claim 8, wherein said lubricating modular unit is arranged between said main gear drive means and said reduction gear transmission means.

10. The gas turbine power plant of claim 7, wherein said separate lubricating modulator unit comprises a lubricant reservoir tank, an air-cooled lubricant cooler, a cooling air blower, and a drive motor for driving said cooling air blower.

11. The gas turbine power plant of claim 1, wherein said reduction gear transmission means are constructed as a self-sufficient auxiliary modular unit comprising lubricant circulating pumps (23, 24) coupled to and driven by said reduction gear transmission means.

12. The gas turbine power plant of claim 1, wherein said shaft means comprise a shaft section forming part of said compensating means, said shaft section including a first portion connected to a power output of said main engine and a second portion connected to a power input of said reduction gear transmission means, said compensating means further comprising outer cover means comprising a plurality of pipe sections for enclosing said shaft portions, and universal joint means for articulately coupling said pipe sections to each other, said engine comprising an engine housing, said reduction gear transmission means comprising first gear housing means, said mounting means comprising flange mounting means for connecting said outer cover means to said engine housing and to said first gear housing means.

13. The gas turbine power plant of claim 12, further comprising removable locking means for rigidly locking said universal joint means of said outer cover means against pivoting.

14. The gas turbine power plant of claim 12, wherein said shaft section includes at least one further shaft portion and flexible means (42, 43) for yieldably interconnecting said further shaft portion between said first and second shaft portions.

15. The gas turbine power plant of claim 14, wherein said flexible means (42, 43) are disks welded to said shaft portions and to one another in bellows fashion, and wherein said flexible disks form vibration dampers for said power plant.

16. The gas turbine power plant of claim 15, wherein said shaft portions are hollow tubular members.

* * * * *